Jan. 3, 1933. G. E. HOWARD 1,892,765
METHOD AND APPARATUS FOR FEEDING MOLTEN GLASS
Filed Feb. 27, 1919 4 Sheets-Sheet 1
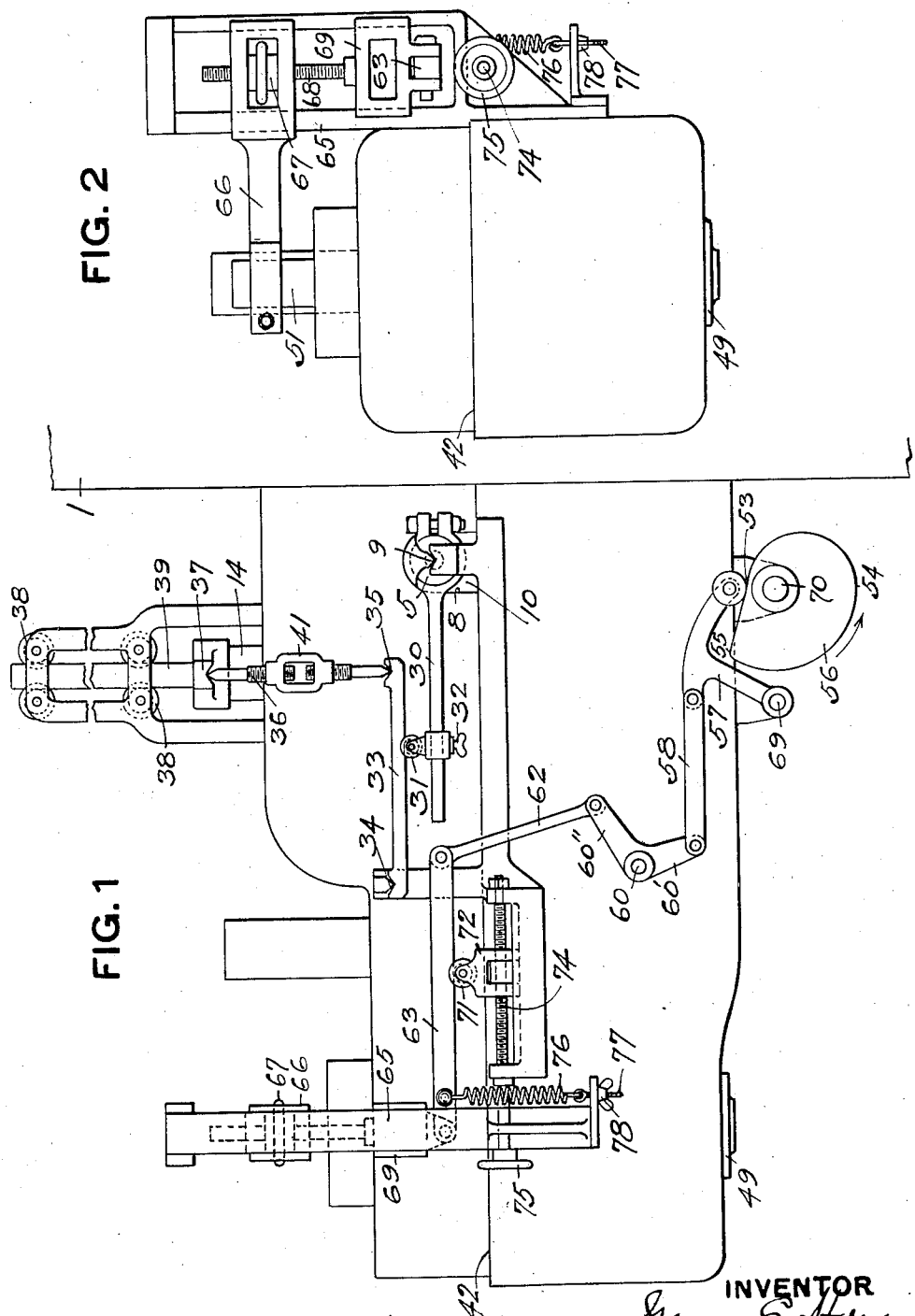
INVENTOR
George E. Howard
By Ray Fathen Powell
attys Jan. 3, 1933.    G. E. HOWARD    1,892,765
METHOD AND APPARATUS FOR FEEDING MOLTEN GLASS
Filed Feb. 27, 1919    4 Sheets-Sheet 3

INVENTOR
George E. Howard

Jan. 3, 1933.  G. E. HOWARD  1,892,765
METHOD AND APPARATUS FOR FEEDING MOLTEN GLASS
Filed Feb. 27, 1919  4 Sheets-Sheet 4

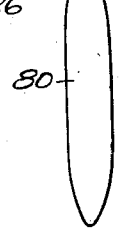

INVENTOR
George E. Howard,
By Ray Totten Powell
attys

Patented Jan. 3, 1933

1,892,765

UNITED STATES PATENT OFFICE

GEORGE E. HOWARD, OF BUTLER, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE

METHOD AND APPARATUS FOR FEEDING MOLTEN GLASS

Application filed February 27, 1919. Serial No. 279,541.

This invention relates to a method and apparatus for delivering molten glass from a tank furnace and belongs to a class of flow feeds that forms a gather in a suspended mass and does not depend upon the action of cups, shears, and other outside agencies to operate.

In delivering molten glass one difficulty in the past has been variation in weight of gathers delivered. This difficulty arises from variation in the level of glass in the tank furnaces, due to periodic filling and to variation in the temperature of the furnace. The increase in level of the metal line in the tank increases the amount of glass delivered and in the usual form of flow-feeds there is a long forehearth with considerable radiation. As the glass is usually controlled at its outer end, the increased level brings more glass and more heat into the feed chamber so that the viscosity of the delivered glass is decreased.

This further increases the amount delivered and the action is a progressive one with very wide limits.

This necessitates the constant attention of an operator and while the labor of gathering the glass is eliminated, the cost of skilled attendance greatly offsets the saving effected.

In making bottles and especially those known in the art as narrow neck bottles, the shaping of the gather is important and glass feeders have been unsuccessful, except with a few styles of ware on account of inability to control the shape to meet the conditions of manufacture.

The objects of the invention are:

1st. To control the amount of glass fed.

2. To so shape the gob or gather that it can be made to approximate the general outlines of the completed product.

3. To control the gather at such speed as will meet the conditions imposed by the standard semi-automatic blowing machines.

4. To reduce the shear mark and equalize its temperature, etc.

5. To reduce the fuel required for heating the glass in the feeding chambers.

6. To eliminate or reduce tendency to stratification.

Figure 3:
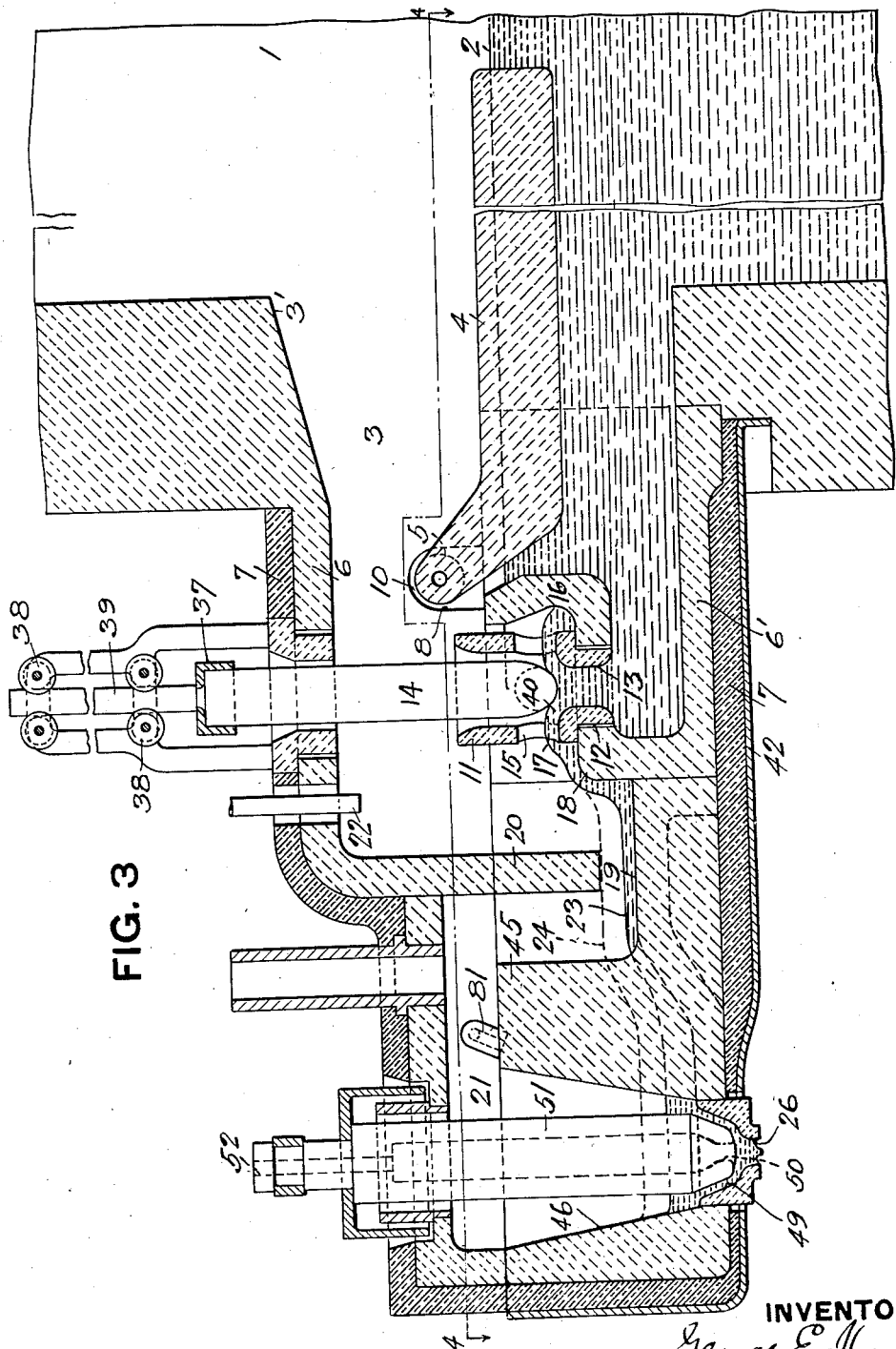
Figure 4:
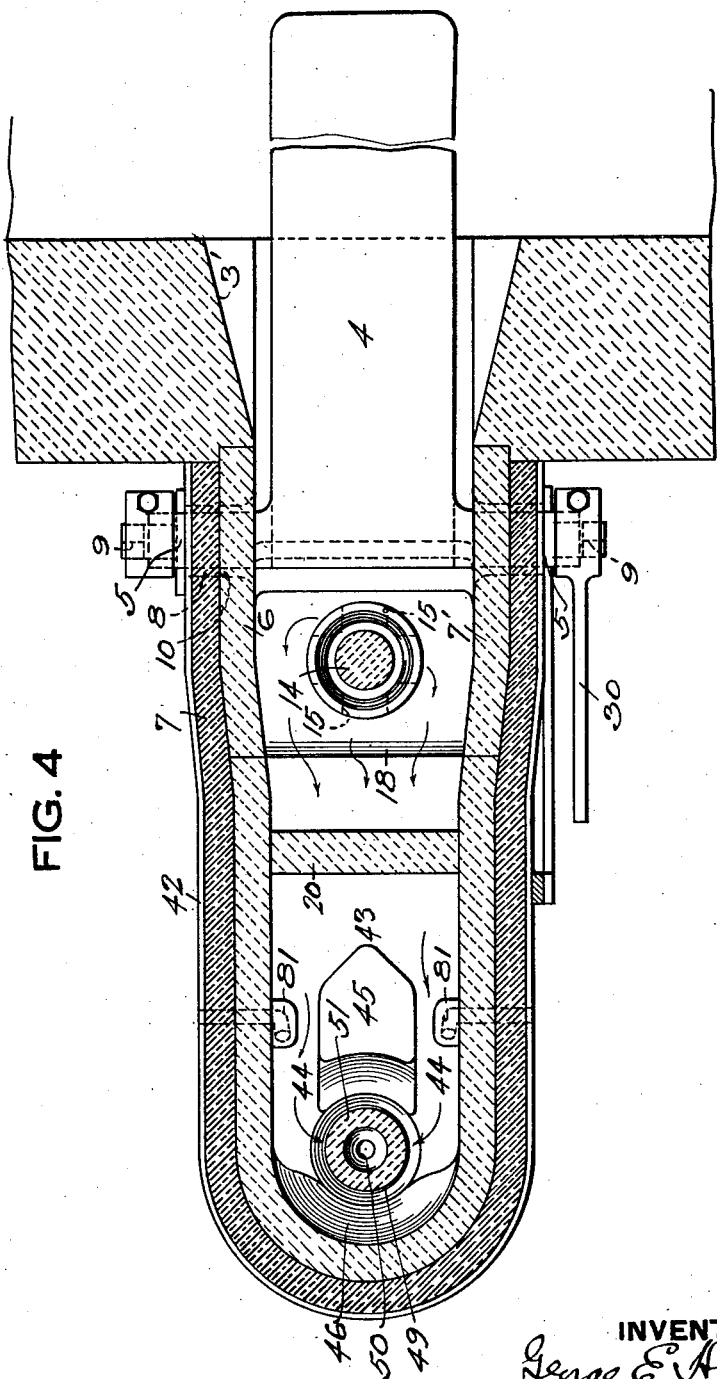

In the accompanying drawings Fig. 1 is a side elevational view of a glass feeding device embodying my invention; Fig. 2 is an end elevational view of my apparatus as seen from the left of Fig. 1; Fig. 3 is a longitudinal vertical sectional view taken centrally through the same apparatus; Fig. 4 is a horizontal sectional view taken substantially along the line 4—4, Fig. 3; and Figs. 5 to 10, inclusive, are vertical sectional views of the discharge mechanism showing the successive steps by which the gather is formed.

In Figs. 1 and 3 the numeral 1 indicates a portion of a tank of usual design filled with glass up to the metal line 2 and provided with a forehearth or projecting chamber 3. The metal line 2 will be approximately level in both tank 1 and chamber 3. A floater 4 covers a portion of the surface of the glass in chamber 3 and extends preferably into tank 1.

The float 4 has trunnions 5 which extend above the metal line 2 and project outside walls 6 to 7 of the cover through an opening 8 which has a clearance space 10. These trunnions rest on knife edges 9 which support one end of the float 4 while the buoyancy of the float 4 immersed in the glass supports the other end. Glass from the lower layer in tank 1 flows under the float 4 through an opening 13 in a wearing piece 11 which rests in an opening 12 of a partition wall 16. A valve 14 controls the size of the opening 13 and measures the amount of glass delivered through the opening 13. After passing the valve 14 the glass flows through openings 15 and thence over a lip 18 to bottom 19 under a partition 20 which separates the chamber 3 from the chamber 21. Attention is directed to the fact that the float 4 and the location of opening 13 draw the glass from the tank 1 from layers considerably below the surface at the metal line 2.

The variation in temperature of the gases of combustion in the furnace 1 and especially in regenerative tanks where the fuel is burned alternately at opposite sides of the furnace, causes the temperature of the surface layers to vary. This variation decreases rapidly at points below the surface so that by drawing the supply from these lower layers uniformity in temperature and viscosity of flow are as- In operating a tank furnace the material composing the batch is fed periodically usually once each hour into the tank during a period of 5 to 10 minutes and worked out into bottles or other articles at a regular rate, so that the level 2 suddenly rises and slowly recedes.

This change in level causes a corresponding change in flow or quantity of glass delivered from the feeder.

To take care of this applicant uses the automatic float 4, Fig. 3, which rides upon knife edges 9, Fig. 1. Rigidly connected to one of the trunnions 5 of the float 4 is a lever 30 Fig. 1, and on this lever is a sliding roller 31 held in position by a thumbscrew 32. The valve 14 is attached to a horizontal arm 37 which rests upon a post 36 and the post 36 has a knife edge 35 supported on a lever 33 which rests upon the roller 31. A knife edge 34 prevents the lever 33 from rising at its end opposite to 35. Arms 37 are attached to a guide 39 which runs in flanged rollers 38 to keep valve 14 in alignment.

In operation, the weight of the valve, rods, and levers will cause the float 4 to assume a certain position for any given glass level. If the glass rises, the float will rise, dropping roller 31, and valve 14 and contracting the space 40 between the valve 14 and the discharge opening 13.

By shifting roller 31 the ratio of this contraction can be made so that the contracted opening will deliver the same amount of glass at the higher level as at the lower level.

It is obvious that with different rates of discharge the space 40 will vary and the post 36 is therefore provided with turnbuckle 41 which provides means for changing the space 40 to suit the amount of glass desired. The proper point to adjust valve 14 and roller 31 would preferably be found by actual trial. For different levels there might be some slight variation in the embodiment shown, but it is obvious that such variation would be very small and it is equally obvious that any particular apparatus could be arranged to avoid even this variation.

If there is no variation in amount discharged there can be no progressive temperature change.

Provision is made, however, to eliminate such variation independently of the automatic float valve control.

Valve 14 is placed close to tank 1 and chamber 3 is open to the action of furnace gases through an opening 3' in the furnace wall. To prevent radiation, the chamber 3 is constructed of different wall layers. The cover 6 as well as glass containing portion 6' are made of refractory material suitable to resist the melting and fluxing action of the hot gases and the molten glass. Such materials are of low heat, insulating value and in order to prevent radiation a second layer 7, of heat-insulating material, is used between 6 and the outer air. This insulating material does not usually have the strength necessary to make a suitable bottom or side so that a third layer of sheet metal or other structural material 42 is used for the bottom and may form the sides of the forehearth.

This method of reducing radiation keeps the difference of temperature very low and in order to correct any slight difference still remaining, a burner 22 is provided to equalize the temperature of the outer portion of chamber 3 with tank 1.

After glass flows through opening 13 past valve 14 it passes through ports 15 of cage 11, spreads in a thin layer over the top of the partition wall 16 and thence over ledge 18 at level 17. This apron or ledge 18 is wide relative to diameter of 13 and in passing down over this ledge, its rate of flow is not according to gravity but is governed by the adhesion of the glass to the surface of the ledge, and the rate of flow or travel is approximately constant for small or large differences of height. This an important function of applicant's method for stability of flow depends upon level 2 and level 17 and applicant separates his controlling function through valve 14 from the later collecting and shaping function at orifice 26. By this method of capillary flow over a ledge, level 17 is not affected by change in level in shaping chamber 21. Thus at metal lines 23 and 24 level 17 remains constant.

Temperature conditions in chamber 3 are kept independent of temperature conditions in chamber 21 by using the partition 20 which practically separates these chambers.

Baffling with baffles 45 and 46 and dividing the flow in two streams of small section 44 equalizes the temperature condition and eliminates the dam action of any apparatus placed above the orifice 26.

In former constructions, a glass storage is present in front of the shaping tube which causes a body of chilled glass to accumulate at this point and produces streaks in the glass, due to different natures in the glass. It also causes the gather formed to be unsymmetrical as to temperature, so that one side tends to stretch more than the other and thus causes the gather to curl or curve and prevents its dropping into the mold properly.

In my method I prevent any accumulation of glass in front of the tube by filling the space with a clay baffle as shown at 46, or by filling this space with a portion of the walls 6 and 7 of the containing receptacle.

The gather then discharged does not have uniform temperature but it has symmetrical temperatures, the cooler sides and the hotter sides being opposite, and thus in forming it does not curl or bend but drops in a straight plumb-bob-like configuration.

The difference in temperature in the body of the drop is not sufficient to cause any appreciable difference in thickness in the finished article, and if such difference is evident at all, it is alike for opposite sides of the finished ware.

After the glass flows past the baffle 45, it enters the cup 49 in which is placed a plunger which may be hollow. The hollow center of plunger has an opening 50 preferably less in diameter than the orifice 26. The plunger 51 is considerably larger than the orifice 26 but smaller than the interior of cup 49. At the top of plunger 51 a vent 52 opens to the air insuring atmospheric pressure at all times in the interior of plunger 51. The cup 49 forms a well or impulsion chamber in which the lower end of the plunger operates.

The plunger is provided with an adjustment to regulate its vertical position relative to cup 49. It is also given a vertical travel. Such travel is adjustable as to amount and preferably such adjustment does not alter the lowest position of the plunger but alters the highest position only when changing the distance traveled.

The speed of the plunger is not constant but is governed according to the needs of the drop or gob. Any suitable mechanism can be used to effect this motion, a cam and lever arrangement shown in Fig. 1 being a preferred arrangement.

Referring to Fig. 1, a cam 56 is driven by a shaft 70 in a counter-clockwise direction, operating the rocker arm 57 fulcrumed at 69. A connecting rod 58 connects with an arm 60' of a bell-crank 60, and a connecting rod 62 connects with an arm 60'' of the bell-crank and to a lever 63 which rides on roller 71 and causes a slide 69 to ride up and down in guides 65. An arm 66 slotted to receive a nut 67 is fastened to slide 69 by means of a screw 68. At its outer end the arm 66 clamps the plunger 51 and causes it to travel with slide 69.

By turning nut 67 the position of plunger 51 relative to cup 49 can be varied.

Turning the hand-wheel 75 and screw 74 causes roller stand 72 to move and this varies the leverage of lever 63 causing variation in the amplitude of travel of plunger 51.

Lever 63 is parallel to screw 74 when plunger 51 is at the bottom of its stroke. Hence it is obvious that moving roller 71 at this point will not alter the lowest position of plunger 51. It will obviously vary the amplitude of travel of the plunger as it changes the leverage of lever 63.

Attention is called to the fact that, in applicant's method of moving the plunger, the cam and other mechanism operate positively only in raising the plunger 51. In descending, all parts are riding and moving by gravity so that in case any object gets between plunger 51 and cup 49 no damage is done to the parts.

A spring 76 attached to lever 63 and adjustable in its tension through a screw 77 and a nut 78 assists the weight of the parts riding properly on the cam 56.

In practical operation the arrangement of parts shown in Fig. 1 and the travel of the plunger in three phases have been found preferable. Cam 56 is shown as spiral for 180° from 53 to 54. From 54 to 55 or 125° of rotation it is radial about the center of the shaft causing plunger 51 to pause at top of stroke; from 55 to 53 or 55° a rapid descent is made.

The effect of this differential travel is shown in Figs. 5 to 11 inclusive.

Figure 5:
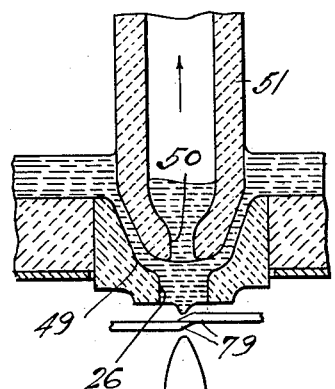
Figure 6:
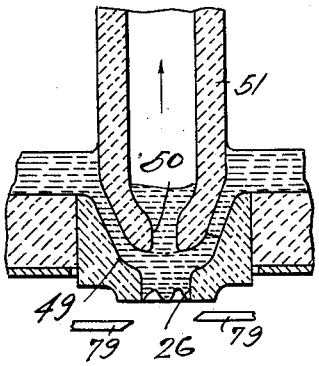
Figure 7:
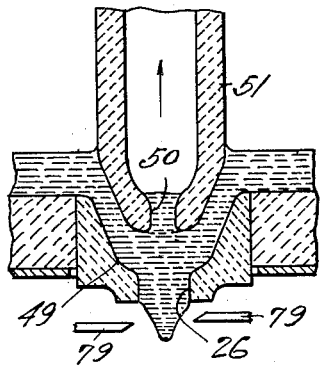

In applicant's method Fig. 5 shows a drop 80 severed by shears 79. Plunger 51 is rising at this time pulling up glass in the orifice 26. If the plunger were solid, the glass in the orifice 26 would normally form a hollow or inverted cup outline. Owing to the hollow center and the glass contained therein, the upward action of the plunger has less effect at the center of the orifice and a small tit or point remains. As plunger 51 continues to rise, Fig. 6, this point still remains and the void created by plunger 51 leaving cup 49 is partially relieved by glass from the interior of the plunger 51. This causes a doughnut shaped cup to form leaving the small point exposed to the radiation of heat from the surrounding glass in the orifice 26. As the plunger rises higher, Fig. 7, the void in the cup is further relieved by the glass entering the cup between its sides and the sides of the plunger. This space progressively increases during the upward rise of plunger 51.

Figures 8, 9:
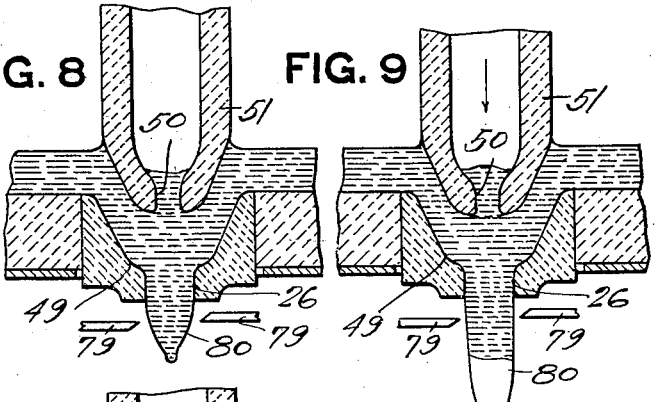

At Fig. 8 the plunger pauses at top of its rise and glass flows more rapidly downward from the outlet 26, the small point leading, under the influence of gravity, the action of gravity at this time being neither retarded nor accelerated. Fig. 9 shows the plunger just starting to descend, pushing out glass through the outlet 26 fast enough to prevent the drop 80 from contracting.

Figures 10, 11:
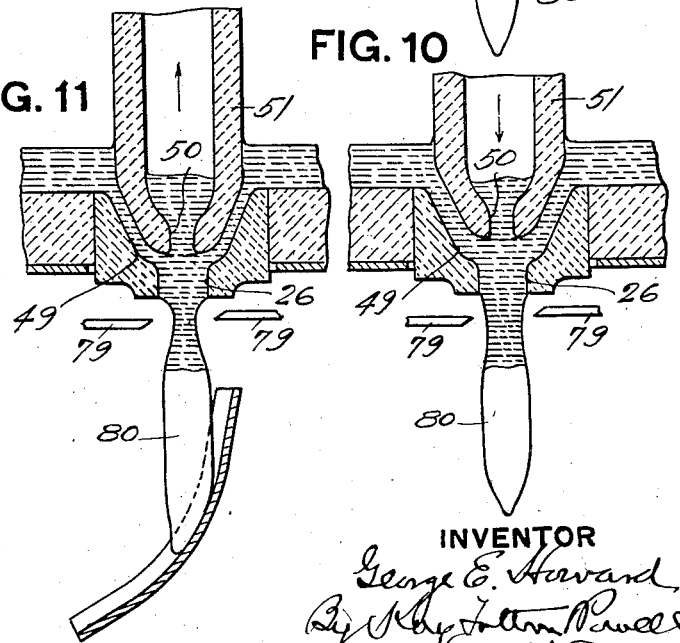

Fig. 10 shows this action as the plunger nears the bottom of its stroke. In addition to pushing glass out to maintain the section of the drop, some glass is forced upwardly into interior of the plunger 14.

At Fig. 11 the plunger starts to rise, pulling glass upward into the outlet 26 while the weight of the drop 80 pulls downwardly. This causes a sudden contraction of the drop at a point near the outlet and it is sheared by shears 79 at this contracted portion and the operation repeated.

The essential characteristics of applicant's drop forming method are, first, a variable time element in which the flow-resisting force is applied during a considerable period of time; a pause in which only the normal flow due to head of glass over the orifice constitutes the force starting the glass downward, and a period relatively shorter than the resisting period in which the expulsive or expressive force is applied to force the glass through the orifice more rapidly than by the action of gravity due to the head or pressure of the glass.

A further characteristic of the expressing force is that it is progressively effective in forcing the glass out as it nears the end of its period. This is due to the contracting of the areas through which the pressure can force the glass backward into the containing chamber, while the area of the outlet 26 and its consequent resistance to flow remains constant.

A second characteristic of applicant's method consists in regulating the amount of glass delivered at a point near the tank where temperature and level conditions are fairly constant, and afterwards discharging and forming the drop at another portion further from the tank where the levels of glass are appreciably lower than the level of surface of glass in tank 1.

A third characteristic is that applicant depends primarily upon the expressing force to deliver his glass and it is preferable to have only enough head to insure the filling of cup 49 sufficiently to form a mass of glass of proper size for the plunger to produce action upon. This head obviously rises and falls in the cup and its adjacent channels during the action of the plunger in rising and falling. The tendency of glass to adhere to hot surfaces is taken advantage of in order to insure a good retractive action to the drop immediately after severance by the shears. Where there is any considerable head of glass in the orifice, as in the usual practice, this head exerts a constant downward pressure tending to cause a flow through the outlet 26 and neutralizes or overcomes entirely the adhesive tendency of the glass to follow the plunger in its upward stroke by the tenacity of its particles adhering to said plunger. While applicant's method does not depend upon a hollow plunger or in fact any specific means for giving this expulsive action, this particular means has been found preferable.

It is obvious that as glass is being delivered constantly through the opening 13 and intermittently through the outlet 26, the space 40 between valve 14 and opening 13 would have to be smaller than the orifice 26 to deliver the same quantity of glass. This is set forth and claimed broadly in Letters Patent of the United States No. 1,255,884 granted to me February 12, 1918.

In discharging the expulsive force is very weak when the plunger is at its top position, as its displacing action is diverted into the space between the plunger and the cup which is large in this position, hence this initial motion of the plunger is made faster and the spring 76 acts in such a manner as to give its greatest force at the start.

After the drop is severed, it is passed through a trough or deflector into the shaping mechanism. This trough is placed and formed so that the drop is hanging freely at time of severance, but in case the glass becomes hotter and tends to stretch unduly by reason of variation in the heat or the cooling action of the outside air or from any other cause, then this trough serves to further support a drop and prevent its undue elongation before severance, see Fig. 11. In making certain styles of ware, the drop can be formed by this partial support and prevented from stringing out and causing defects in the finished product.

Many advantages result from use of my method, among which are the following:

Controlling the flow with the temperature of the glass equalized with the tank temperature prevents long swings or changes in weights due to change in viscosity of the glass whenever for any reason the flow should increase in amount.

Automatically controlling or equalizing the flow for changes in tank level prevents variation in weight and eliminates the necessity for an operator to adjust the apparatus when such changes in tank level take place.

Separating the forming function of the process from the controlling function, allows the forces used for this purpose to be operated at the best point for such forming function, which is not possible when dropping, forming and controlling have to be combined in one function.

Where the appended claims refer to a "gather" of glass this term is intended to mean a complete mold-charge either severed from the parent body of glass or ready to be severed. Where the claims refer to glass which is still incomplete or unformed, such glass is referred to as "a mass", "a drop" or simply as "the glass."

I employ air or other means through openings such as 81 in Fig. 3 to cool the glass in forming chamber 21 to any desired temperature, should the glass be too hot for purposes of making bottles. It is possible to do this in my method because the equalizing of the flow at the discharge point and preventing the glass from forming into large masses at this point will not cause stratification, as in methods where a large body of glass is kept in the forehearth over the discharge opening. It lessens the necessity for depending upon radiation of the forehearth to control the temperature of the glass at times and the consequent necessity for burners to maintain the heat in the glass at other times. It thus saves fuel. Many other advantages are obvious to those skilled in the art.

What I claim is:

1. The method of feeding molten glass from tank furnaces which comprises causing the resistance to the flow of the molten glass at the discharge point to be automatically varied in response to variations in the level of the molten glass in the tank whereby the rate of flow of the glass at the discharge point is maintained substantially constant.

2. The method of feeding glass from tanks which comprises flowing the glass from a tank furnace, and regulating the discharge automatically in response to variations of tank level, by varying the area of the discharge opening to correspond to such changes in level.

3. The method of feeding glass from tanks which comprises flowing the glass from a tank by gravity, automatically controlling the gravity flow, in response to variations in glass level in the tank to maintain a constant and uniform flow from the tank, afterwards shaping the glass into freely hanging gathers of a shape other than that produced by gravity, surface tension and a shearing member, the said shaping operation being independent of the said controlling operation, and severing each of the said gathers before it comes in contact with a mold.

4. The method of feeding glass from tanks which comprises automatically controlling the flow of glass at a point adjacent the tank in response to variations of level in the tank, discharging the glass through a downwardly opening outlet and shaping it at a point further removed from the tank, into a freely hanging gather of a shape other than that produced by gravity and surface tension, the said shaping operation being independent of the said controlling operation, and severing the said suspended gather before it comes in contact with a mold.

5. The method of feeding glass to shaping mechanism which comprises passing the glass through an opening, retarding the movement of the glass to produce the desired amount, equalizing the temperature at the point of retardation with that of the adjacent supply, afterwards passing the glass to another point for the purpose of shaping the gather, and bringing the glass to a temperature proper for forming the gather.

6. The method of feeding glass to shaping mechanism which comprises flowing the glass from a tank to the discharge outlet of a closed chamber and cooling the glass at some point between the tank and the said discharge outlet by regulated application of air.

7. The method of feeding molten glass from tanks that comprises continuously passing the glass from the tank into a forehearth, discharging the glass upwardly from the forehearth, then passing all the said discharged glass downwardly toward a delivery point, and then shaping the said glass into freely hanging gathers for delivery to molds.

8. The method of feeding molten glass from tanks that comprises passing the glass from the tank into a forehearth, discharging the glass upwardly therefrom, spreading the glass into a thin layer to govern its rate of flow, and passing the glass to a point for shaping into a gather for delivery to a mold.

9. The method of feeding molten glass from tanks that comprises taking the glass from a point below the surface of the glass in the tank, continuously discharging the glass upwardly from such point without materially checking its flow, then passing all of the said discharged glass downwardly toward a delivery point, and shaping the said glass into freely hanging gathers for delivery to molds.

10. The method of feeding molten glass from tanks that comprises controlling the amount of glass discharged in response to the variation of the level of the glass in the tank, by causing the said variation in level to equalize the quantity of molten glass discharged at a point removed from the main body of glass in the tank, thereby producing at that point a constant level for different levels of molten glass in the tank.

11. The method of feeding molten glass from tanks to form a gather that comprises taking the glass from a point below the surface, discharging the glass from such point, spreading the glass in a thin layer, and passing it over a surface to which it will cling to a lower level for the shaping of the gather.

12. The method of feeding glass from tanks which comprises automatically controlling the delivery of the glass from the tank by varying resistance to its flow in response to changes in the level in the tank, then forcing the glass through an opening to form a freely hanging mass and severing the said mass before it comes in contact with a mold.

13. The method of feeding glass from tanks which comprises controlling the flow of glass from a tank having approximately uniform glass level to a forehearth chamber having a normal glass level lower than that in the tank, then passing the glass from that chamber to a shaping chamber having a still lower normal glass level then forcing glass through an orifice to form a freely hanging mass, and severing the said mass before it comes in contact with a mold.

14. The method of feeding glass from tanks which comprises controlling the gravity flow of glass from a tank by varying resistance to the flow in response to variations in glass level, passing the glass to a discharge chamber, discharging a small portion from the discharge chamber through an outlet by gravity, and a relatively larger portion by an impulse action on the glass, the portion passing by gravity and the portion forced by impulse action uniting outside of the orifice to form a suspended mass of a shape selected from among a number of possible shapes, and severing a mold charge from each suspended mass.

15. The method of feeding glass which comprises passing glass from a tank or other containing receptacle, controlling the amount of glass delivered by varying resistance to its passage from the tank, regulating the temperature of the glass at the controlling point, then passing the glass to another compartment for discharging the glass and independently regulating the temperature therein before leaving the discharge point, both of the said temperature regulating operations being effected within the said containing receptacle.

16. The method of feeding glass which comprises passing molten glass from a tank through a controlling point, and then passing it to a discharge point removed from the said controlling point, keeping the glass in a continuous stream or body from the tank to the discharge point, regulating the temperature of the glass at the controlling point to maintain its temperature substantially the same as that of the glass in the tank, and independently regulating the temperature of the glass after leaving the controlling point and before leaving the discharge point to maintain the glass to the discharge point at a temperature lower than that in the furnace.

17. Glass feeding apparatus comprising a tank, means for heating the glass in the tank, automatic means responsive to variations in glass level for maintaining a constant and regular flow of glass from the tank and for thereby preventing change in the viscosity of the glass, and means distinct from a means for heating the tank for equalizing the temperature at the controlling point with the temperature of the tank.

18. Glass feeding apparatus comprising a tank, means defining a discharge opening and means for automatically controlling the discharge of glass through said opening to keep its rate of flow equal for varying levels of molten glass in the said tank.

19. Glass feeding apparatus comprising a tank, means defining a discharge opening and automatic means for varying the area of the said discharge opening in response to variations in level of the molten glass in the said tank.

20. Glass feeding apparatus comprising a tank, a discharge spout attached thereto, having a constantly open discharge outlet in its base, means for causing molten glass to flow from said tank by gravity into the spout and over the outlet, means for controlling said gravity flow responsive to variations in glass level and means associated with the spout and outlet for forcing glass through the outlet at a rate in excess of that of the gravity flow, whereby successive masses of glass are discharged through the outlet and suspended therefrom, and each of said suspended masses is given approximately uniform cross section for a greater portion of its length, means for severing a mold charge from each of said masses, and delivering the charges so severed, to a receptacle located below the plane of severance a distance greater than the length of the mold charge.

21. Glass feeding apparatus comprising a chamber having a discharge outlet in the bottom thereof, means for causing molten glass to flow into the said chamber, means for applying cooling fluid to the said glass during its flow, and means for controlling the application of said cooling fluid to the said glass.

22. Glass feeding apparatus comprising a tank, a forehearth communicating with the said tank, means for discharging molten glass upwardly from the said forehearth, a discharge chamber adapted to receive the discharged glass and having a well formed in its bottom, and accelerating means reciprocating vertically in the said well for shaping the glass delivered into the said forehearth into freely hanging gathers.

23. Glass feeding apparatus comprising a tank, a forehearth communicating therewith, means for discharging molten glass upwardly from the said forehearth, means for spreading the glass delivered from the said forehearth into a thin layer and means for thereafter shaping the said glass into suspended gathers.

24. Glass feeding apparatus comprising a tank, means for removing molten glass from the said tank at a point below the surface of the glass, means for continuously discharging the glass upwardly from the said point, a discharge chamber adapted to receive the said discharge glass and having a well formed in the bottom thereof, the said well having a downwardly opening discharge outlet of less diameter than the upper diameter of the well, and an accelerating member reciprocating in said well for shaping the glass into freely hanging gathers.

25. Glass feeding apparatus comprising a tank, and means for discharging molten glass continuously from the said tank into a discharge spout, the said discharging means comprising automatically operable means for establishing a variable resistance to the flow of the said glass.

26. The method of feeding molten glass from a container having a fixed point of discharge, comprising controlling the discharge, and automatically regulating the control for the discharge in response to variations of the level in the container to keep the rate of discharge from the container constant.

27. The method of feeding molten glass from a tank, comprising automatically increasing the resistance to the delivery of the glass from the tank in response to an increase of the glass level, and automatically decreasing the resistance to the delivery of the glass from the tank in response to a decrease of the glass level, to maintain a constant rate of discharge.

28. The method of forming a mass of molten glass in suspension from the outlet of a container that comprises causing the glass to flow through an annular discharge passageway and thence through said outlet and periodically varying the effective cross section of the said passageway without closing said passageway sufficiently to prevent flow of glass therethrough.

29. Apparatus for feeding molten glass comprising a container having a delivery well formed in the bottom thereof, a vertical plunger arranged to reciprocate vertically with its lower end in the said well, and means for vertically reciprocating the said plunger at variable speed, the said reciprocating means comprising a cam connected to reciprocate the said plunger once for each revolution of said cam, and the said cam being so shaped as to raise the said plunger during substantially 180° of its rotation, to cause the plunger to pause at the top of its stroke during substantially the next 125° of the rotation of said cam, and thereupon to permit the said plunger to descend by gravity.

30. The method of feeding glass from tanks in a series of regular cycles that comprises rapidly discharging a portion of glass through a continuously open outlet, severing the gather of glass from the parent body, and retarding the formation of the next succeeding gather during a period relatively longer than the said discharging period, and at least one half of the time of a cycle.

31. Apparatus for feeding molten glass in a succession of freely hanging mold charges comprising an impulsion chamber having communication at its upper end with a parent body of glass, a downwardly opening outlet, and a vertically reciprocating hollow impeller having its lower end adapted to enter said impulsion chamber and to alternately expel glass through said outlet, and retract glass through said outlet, without interrupting communication between the outlet and the inlet of said impulsion chamber.

32. In a glass feeder in combination, a container for the glass having a downwardly opening discharge orifice, a reciprocating plunger adapted to move toward and from the orifice in adhesive contact with the glass, means for reciprocating the plunger including a lever arm having an adjustable fulcrum and means for adjusting the fulcrum while the feeder is in operation.

33. In a glass feeder in combination, a container for the glass having a downwardly opening discharge outlet, a plunger adapted to move toward and from the outlet, means for reciprocating the plunger including the cam adapted to impart a variable speed of movement to the plunger and a lever arm connected to the plunger and provided with an adjustable fulcrum, and means for adjusting the fulcrum to vary the plunger movements while the lever is in operation.

34. In a glass feeder in combination, a container for the glass having a downwardly opening discharge outlet, a plunger adapted to reciprocate toward and away from the outlet, means for moving the plunger including a cam and a lever and means associated with the lever for varying the effective lengths of both lever arms.

35. In a glass feeder in combination a container for the glass having an outlet, a plunger adapted to move toward and away from the outlet, means for reciprocating the plunger, including a lever and means located between the ends of the lever for determining the throw of the lever, said means being adjustable in a direction longitudinally of the lever and means for adjusting the last named means, while the lever is in operation.

36. In a glass feeder in combination a container for the glass having an outlet, a plunger adapted to move toward and away from the outlet, means for reciprocating the plunger, including a lever and means located between the ends of the lever for determining the throw of the lever, said means being adjustable in a direction longitudinally of the lever and means for adjusting the last named means.

37. In a glass feeder in combination, a container for the glass having an outlet, a plunger adapted to reciprocate toward and from the outlet, means for reciprocating the plunger comprising a lever, a cam arm and a cam and means for changing the throw of the lever comprising a movable pivot associated with the lever and a screw for shifting the position of said pivot longitudinally of the arm.

38. In a glass feeder, in combination, a container for the glass having an outlet, a reciprocating plunger adapted to move toward and from the outlet, means for moving the plunger including a lever, a roll supporting the lever at a point between its ends, a carrier for the roll adapted for movement longitudinally of the lever, whereby the relative lengths of the lever arms may be varied and a screw member for moving the carrier while the feeder is in operation.

39. In a glass feeder in combination, a container for the glass having an outlet, a plunger reciprocating in the glass, means for imparting movement to the plunger, including a driving mechanism, an arm connected at one end to the plunger, and having a yoke at the other end, a substantially vertical threaded rod adapted to pass through openings in the yoke portion of the arm and a nut threaded on the rod and embraced by the yoke, whereby the vertical position of the plunger may be varied while the plunger is moving.

40. In glass feeding apparatus, a container having a well in its bottom, terminating in a downwardly opening discharge outlet of less cross sectional area than said well, an implement reciprocable vertically in the container and arranged to depend into said well when at the lower end of its stroke, and means for reciprocating said implement vertically, said means including a cam having its working surface formed to cause upward movement of the implement while said cam is rotating through not less than 180 degrees, and then to permit a more rapid downward movement of the implement by gravity alone than the upward movement while said cam is turning through a substantial part of the remainder of its cycle of rotation.

41. In glass feeding apparatus, a container having a downwardly opening discharge outlet, an implement reciprocable vertically in the container relatively to the outlet, and means for reciprocating said implement vertically, said means including a cam having its working surface formed to cause upward movement of the implement while said cam is rotating through not less than 180 degrees, and then to permit a rapid downward movement of the implement by gravity alone while said cam is turning through a substantial part of the remainder of its cycle of rotation.

42. Apparatus for feeding molten glass in controllably shaped, suspended mold charges, comprising a container for the glass provided with an impulsion chamber having downwardly converging sides and having a discharge outlet in its bottom, and a discharge controlling implement adapted to reciprocate vertically above said outlet, and having its lower end in said well when said implement is in its lowest position but when in such position being out of contact with the walls of the well, the converging side walls of the chamber cooperating with the implement to vary the cross section of the space between the walls of the chamber and the implement to thereby vary the dynamic effect of the implement upon the discharging glass to control the rate of discharge of the glass and to thereby controllably shape charges while in free suspension from the outlet.

43. Apparatus for feeding molten glass in controllably shaped suspended mold charges, comprising a container for the glass provided with a well having downwardly converging sides and having a discharge outlet in its bottom of smaller diameter than the bottom of said well and a discharge controlling implement adapted to reciprocate vertically above said outlet, and having its lower end in said well when said implement is in its lowest position but when in such position being out of contact with the walls of the well, the converging side walls of the well cooperating with the implement to vary the cross section of the space between the walls of the well and the implement to thereby vary the dynamic effect of the implement upon the discharging glass to control the rate of discharge of the glass and to thereby controllably shape charges while in free suspension from the outlet.

In testimony whereof, I the said George E. Howard have hereunto set my hand.

GEORGE E. HOWARD.